United States Patent
Schotten

(10) Patent No.: US 7,643,841 B2
(45) Date of Patent: Jan. 5, 2010

(54) RECEIVER PERFORMANCE CONTROL

(75) Inventor: Hans Dieter Schotten, Nürnberg (DE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 10/544,526

(22) PCT Filed: Mar. 17, 2003

(86) PCT No.: PCT/EP03/02764

§ 371 (c)(1),
(2), (4) Date: May 19, 2006

(87) PCT Pub. No.: WO2004/084431

PCT Pub. Date: Sep. 30, 2004

(65) Prior Publication Data

US 2006/0258343 A1     Nov. 16, 2006

(51) Int. Cl.
*H04B 7/00* (2006.01)

(52) U.S. Cl. .............. 455/522; 455/453; 455/571; 455/572; 455/573; 370/318; 370/320

(58) Field of Classification Search .............. 455/418, 455/522, 543, 571, 572, 573; 370/335, 394, 370/320, 318
See application file for complete search history.

(56) References Cited

U.S. PATENT DOCUMENTS

| | | | |
|---|---|---|---|
| 5,649,299 A | 7/1997 | Battin et al. | |
| 6,343,212 B1 * | 1/2002 | Weber et al. | 455/404.1 |
| 2002/0072385 A1 * | 6/2002 | Salvarani et al. | 455/522 |
| 2003/0003939 A1 * | 1/2003 | Banerjee | 455/522 |
| 2003/0026219 A1 * | 2/2003 | Moon et al. | 370/318 |

FOREIGN PATENT DOCUMENTS

| | | |
|---|---|---|
| EP | 0 868 093 A1 | 9/1998 |
| GB | 2 343 331 A | 5/2000 |
| WO | WO 03/052965 A1 | 6/2003 |

OTHER PUBLICATIONS

PCT International Search Report, dated Nov. 26, 2003, in connection with International Application No. PCT/EP2003/02764.
PCT International Preliminary Examination Report, dated May 31, 2005, in connection with International Application No. PCT/EP2003/02764.

* cited by examiner

*Primary Examiner*—Vincent P Harper
*Assistant Examiner*—Fred A Casca
(74) *Attorney, Agent, or Firm*—Potomac Patent Group PLLC

(57) ABSTRACT

A method of operating a network node that controls a component of a wireless communications network is described. The network component has a receiver with at least one receiver structure that can assume two or more states, including a first state corresponding to an enhanced receiver performance and a second state corresponding to a reduced receiver performance and a reduced power consumption. The method comprises determining a network condition and, in dependence of the network condition, generating a performance control signal that aims at controlling the state of the receiver structure, and transmitting the performance control signal to the network component. The invention is further directed the performance control signal generated by the network node and the network component which the network node intends to control.

8 Claims, 3 Drawing Sheets

RECEIVER PERFORMANCE CONTROL

FIELD OF THE INVENTION

The invention relates to wireless communications networks. More specifically, the invention relates to aspects in context with network components that have an enhanced receiver performance.

BACKGROUND OF THE INVENTION

Standardization is one of the key features of modern wireless communications networks. Thus, standardization documents like those issued by the 3rd Generation Partnership Project (3GPP) and the specifications defined therein have become of high importance to manufacturers of network infrastructure in general and manufacturers of network components like mobile terminals in particular.

A central aspect of all standardization approaches are specific minimum requirements. Such minimum requirements insure a high compatibility among network components from different manufacturers. At the same time minimum requirements do not hinder the introduction of more sophisticated features for the benefit of network operators or network users.

One field for which minimum requirements are usually defined is the performance of receivers that are included in many network components. Usually, the receivers are embedded in so-called transceivers that additionally perform signal processing tasks in context with signal transmission.

Network components that include sophisticated hardware or software features like interference cancellation mechanisms, and thus have a receiver performance higher than the minimum requirements, are usually particularly advantageous from the point of view of a transmitting network component. The reason for this is the fact that a high receiver performance allows to reduce the transmit power of the receiver's counterpart. A reduced transmit power is not only desirable because of a lower power consumption but also because it allows to reduce interference effects and to increase network capacity.

Modern wireless communications systems like wideband code division multiple access (WCDMA) systems have intelligent power control schemes and features that guarantee a certain quality of service (QoS). It is evident that in the presence of such mechanisms there is no clear benefit for a user of a network component like a mobile terminal that has a receiver performance higher than the minimum requirements. While the high receiver performance allows a serving network node to reduce its transmit power and thus increases the network capacity, the user might even pay for these advantages because of the higher power consumption usually associated with sophisticated receiver structures.

There is a need for an approach that improves aspects in context with network components having sophisticated receiver structures. More specifically, there is a need for methods and devices that allow a more advantageous implementation of mechanisms that guarantee an enhanced receiver performance.

SUMMARY OF THE INVENTION

In a network scenario with a network node and a network component which has a receiver with a receiver performance that is adjustable by means of at least one receiver structure that can assume two or more states including a first state corresponding to an enhanced receiver performance and a second state corresponding to a reduced receiver performance and a reduced power consumption, this need is satisfied from a point of view of the network node by the steps of determining a network condition, generating, in dependence of the network condition, a performance control signal that aims at controlling the receiver performance, and transmitting the performance control signal to the network component.

Receiver performance control allows to reduce the power consumption of the receiving network component especially if the network as a whole or an individual network component can not or need not benefit from the enhanced receiver performance. This could be the case if the network condition in terms of e.g. interference or network capacity is uncritical or if the network component's demands regarding end-to-end performance are low. If, on the other hand, the network condition is critical, if a high end-to-end performance is required or if a higher power consumption of the network component is not an issue, the receiver performance may be increased.

The performance of a receiver of a network component may be flexibly controlled between two, three or more states. This includes a continuous receiver performance control in the case of a continuum of adjacent states. However, performance control could also be performed stepwise.

Preferably, receiver performance is changed such that the transmission format (including e.g. a modulation format) need not be changed. This is advantageous because receiver performance control can then quickly be performed by the network component without the need of further communication with the network node. The invention could also be practiced if a change of receiver performance is accompanied by a change of the transmission format.

As has been mentioned above, receiver performance control is based on one or more network conditions. Preferably, the one or more relevant network conditions based on which the receiver performance is controlled are chosen such that a control of the at least one receiver structure has a (direct or indirect) influence on these network conditions.

One or more network condition indicators can be taken into account during generation of the performance control signal. As examples for network condition indicators parameters like the network load or the transmission quality (e.g. an interference level) can be mentioned. The network load can be determined in various ways. For example it may be derived from at least one of the transmit power of the network node and the number of network components served by the network node.

The invention further relates to a signal generated by the network node in dependence of a network condition with the purpose of controlling a network component having a receiver with a receiver performance that is adjustable by means of at least a receiver structure that can assume two or more states including a first state corresponding to an enhanced receiver performance and a second state corresponding to a reduced receiver performance and a reduced power consumption. The signal has a signal portion which includes information that aims at controlling the receiver performance, e.g. the state of the receiver structure.

The performance control signal may be a common, non-dedicated signal that addresses all network components receiving the control signal. Alternatively, the performance control signal may be a dedicated signal that includes information for addressing individual network components or individual groups (e.g. classes) of network components.

Especially in cases in which several different options for receiver performance control are available, the performance control signal may further include information relating to one or more particular receiver structure types that are to change their state. Alternatively or additionally, the performance control signal may specify a state request for one or more particular receiver structures. The state request indicates the state the network node requests from the receiver structure. Including such state information in a performance control signal is particularly advantageous if a receiver structure can assume three or more states. Especially when the receiver structure can assume only two states no state information is required. In such a case the mere receipt of the performance control signal can be interpreted as a request directed to a change of the current state of the receiver structure.

For the purposes explained above the performance control signal may additionally comprise one or more signal portions that include information relating to at least one of a receiver structure type, a receiver structure state, individual network components and individual groups of network components.

As regards a method of operating a network component of a wireless communications network, the invention proposes the steps of providing a performance control signal that aims at controlling the receiver performance in dependence of a network condition and of controlling the state of the receiver structure in dependence of the performance control signal.

According to a first variant of the invention the performance control signal is provided to the network component that is to be controlled in the form of a signal that has been transmitted from a further network component like a central network node of the wireless communications network. In such a case the network component receiving the performance control signal has two options. It may either immediately react according to the control signal without further decisions or it may decide whether or not it should react according to the control signal. Combinations of the two options are possible. This means that depending on the content of the performance control signal the network component may either react according to the control signal (e.g. enhance receiver performance in response to an enhancement command without any additional decision process) or decide if a reaction is actually necessary (e.g. decide not to reduce receiver performance in response to a reduction command if power consumption is not an issue because the network component is currently attached to a vehicle battery).

Preferably, the network component decides upon receipt of the performance control signal the way receiver performance is to be changed. This means that the network component may determine the types and states of receiver structures that have to be changed to attain a particular receiver performance specified in the performance control signal.

According to a second variant of the invention the performance control signal is provided by the network component itself. In such a case the network component may determine a network condition and generate the control signal in dependence of the network condition. The network component has various options for determining the network condition. It may for example assess a reaction of the network on uplink power control commands and determine the network load based on the reaction. Alternatively, or in addition, it may assess a transmission quality parameter like a signal strength.

Regardless of the way the performance control signal is provided, the performance control signal will generally aim at changing the state of the receiver structure. Preferably, the two or more states which a particular receiver structure can assume include a least an activated state ("on") and a deactivated state ("off"). Alternatively, the states of the receiver structure may include at least a first activated state and one or more further activated states.

The invention can be implemented has a hardware solution or as a computer program product comprising program code portions for performing the steps of the invention when the computer program product is run on the network node or the network component. The computer program product may be stored on a computer-readable recording medium.

As regards a hardware implementation, the invention is directed to a preferably battery-operable network component which comprises a receiver with a receiver performance that is adjustable by means of at least a receiver structure that can assume two or more states including a first state corresponding to an enhanced receiver performance and a second state corresponding to a reduced receiver performance and a reduced power consumption, a unit for providing a performance control signal that aims at controlling the receiver performance in dependence of a network condition, and a control unit for controlling the receiver structure in dependence of the performance control signal. The individual units of the network component are adapted to jointly perform the method that has been explained above and that will be illustrated below in more detail.

The receiver may be embedded in a transceiver that additionally performs transmission tasks. If the control signal for controlling receiver performance is received from a remote network component, the unit for providing the performance control signal may be configured as an interface for wireless communications.

The receiver structure may include a piece of software or a piece of hardware or a combination thereof. For example, the receiver structure may include at least one of an interference cancellation algorithm, a variable deinterleaving scheme, a variable decoding scheme, a variable demodulation scheme, an antenna switch or combiner and one or more RAKE fingers. The interference cancellation algorithm may either be activated or deactivated in dependence of the requested receiver performance. The variable demodulation mechanism may include a first demodulation scheme ("first state", e.g. QPSK) and second demodulation scheme ("second state", e.g. 16-QAM) with different demodulation performances. The antenna switch may be used to either activate or deactivate one or more antenna paths (to e.g. activate or deactivate a receive diversity mode). The RAKE fingers may individually be switched on or off to enhance or reduce the receiver performance, provided that a sufficient number of propagation paths of the radio channel is present.

The invention is further directed to a network node for controlling the network component that has been discussed above. The network node comprises a unit for determining a network condition, a processor for generating in dependence of the network condition a performance control signal that aims at controlling receiver performance, and a transmitter for transmitting the performance control signal to the network component.

BRIEF DESCRIPTION OF THE DRAWINGS

In the following the invention will be described with reference to exemplary embodiments illustrated in the figures, in which.

DETAILED DESCRIPTION OF PREFERRED EMBODIMENTS

In the following description, for purposes of explanation and not limitation, specific details are set forth, such as particular embodiments, circuits, signal formats etc. in order to provide a thorough understanding of the present invention. It will be apparent to one skilled in the art that the present invention may be practiced in other embodiments that depart from these specific details. In particular, while the different embodiments are described herein below incorporated in a WCDMA system, the present invention is not limited to such an implementation, but for example can be utilized in any transmission environment that allows the use of enhanced receiver techniques. Moreover, those skilled in the art will appreciate that the functions explained herein below may be implemented using individual hardware circuitry, using software functioning in conjunction with a programmed microprocessor or general purpose computer, using an application specific integrated circuit (ASIC), and/or using one or more digital signal processors (DSPs).

Figure 1:
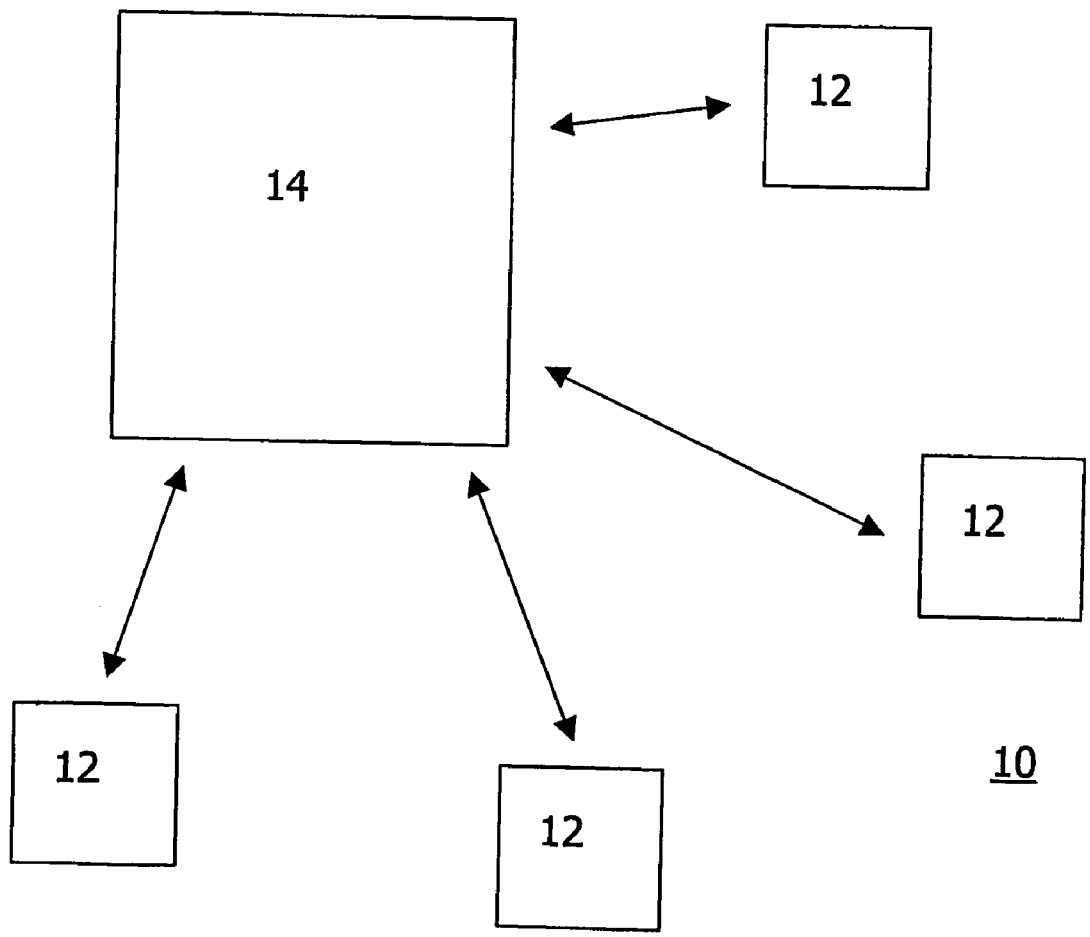
FIG. 1 is a schematic block diagram of a WCDMA wireless communications system.

In FIG. 1 a wireless communications system 10 according to the exemplary WCDMA standard is shown. The system 10 includes a plurality of network components in the form of user equipments (UEs) 12 (e.g. mobile telephones) that communicate with earn other via a central network node in the form of a base station (BS) 14.

Figure 2:
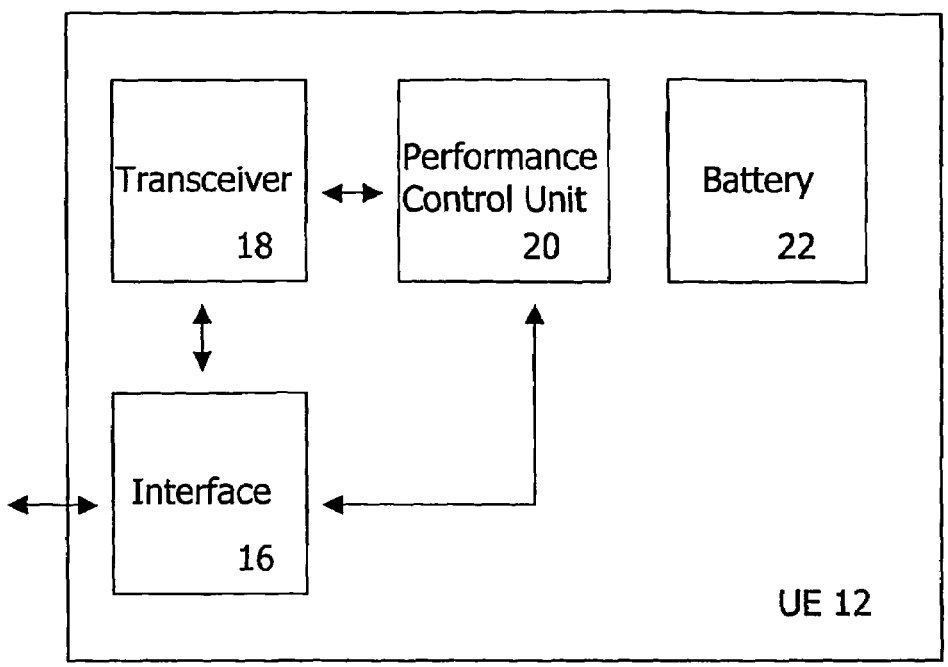
FIG. 2 is a schematic block diagram of a user equipment UE of the communications system of FIG. 1.

The individual units of a particular UE 12 are depicted in FIG. 2. As becomes apparent from FIG. 2, the UE 12 includes an interface 16 for wireless communication. The interface 16 functions as a unit for receiving a performance control signal that has been transmitted from the network node 14 depicted in FIG. 1. The UE 12 further comprises a transceiver 18 which is coupled to the interface 16 and a performance control unit 20 which is coupled to both the interface 16 and the transceiver 18 and which controls the transceiver 18. A battery 22 of the UE 12 serves as a power supply for the components 16, 18 and 20 and for further components not depicted in FIG. 2.

The transceiver 18 internally includes a transmitter branch and a receiver branch. A receiver 24 coupled in the receiver branch of the transceiver 18 is shown in FIG. 3.

The receiver 24 depicted in FIG. 3 has a plurality of receiver structures the function of which will now be explained in more detail. A receiver structure in the form of a demodulator 26 demodulates the signal that has been received via the UE interface 16 shown in FIG. 2. The demodulated signal is input to a further receiver structure, more specifically to a RAKE combiner 28 with a plurality of RAKE fingers (not shown in FIG. 3). The RAKE combiner 28 performs RAKE combining as is well known in the art. The RAKE combined signal is input to an interference cancellation stage 30 in which the RAKE combined signal is subjected to a receiver structure in the form of an interference cancellation algorithm. The signal output by the interference cancellation stage 30 is input to a further receiver structure 32 that performs deinterleaving and decoding. The deinterleaved and decoded signal is then output and subjected to further signal processing steps as is known in the art.

Figure 3:
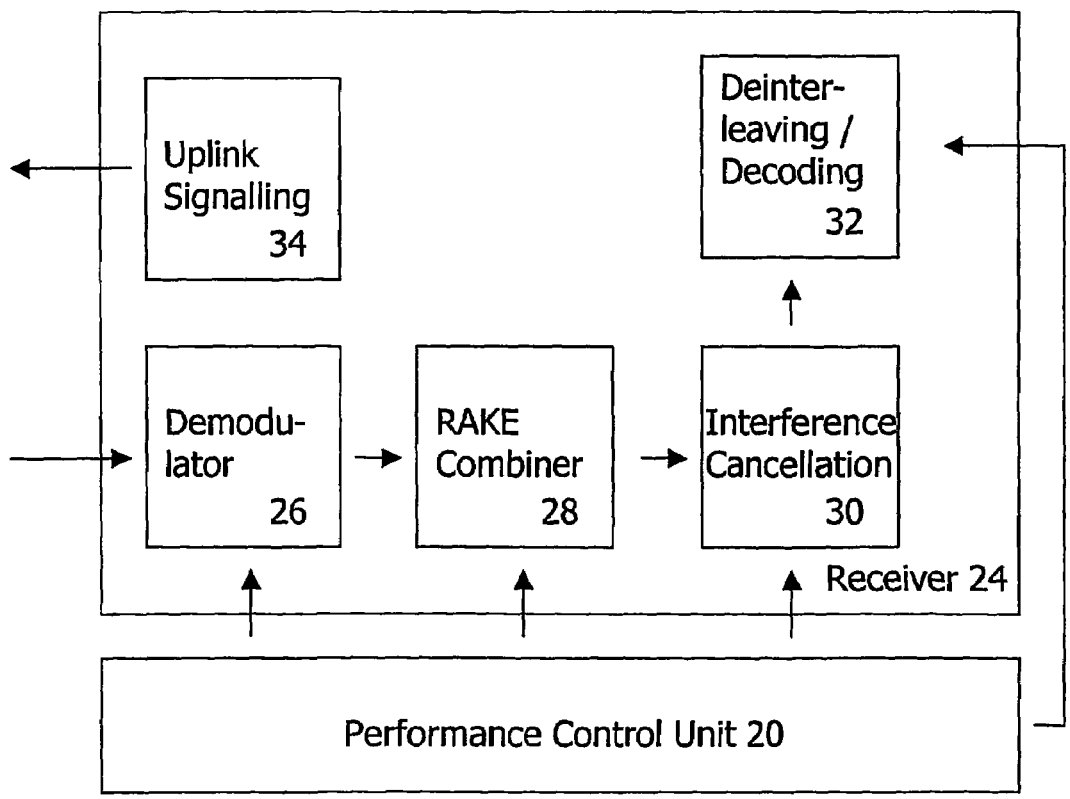
FIG. 3 is a schematic block diagram of a receiver of the UE of FIG. 2.

The receiver 24 of FIG. 3 additionally comprises a unit 34 for generating uplink signalling information. Uplink signalling includes for example the transmission of power control information to the BS. The power control information can include explicit power control commands or implicit information like a channel quality indicator.

As can be seen from FIG. 3 each of the receiver structures 26, 28, 30, 32 has a performance control input that is coupled to the performance control unit 20. Activation or enhanced operation of the receiver structures 26, 28, 30, 32 allows to achieve certain minimum performance requirements with a lower signal-to-interference ratio (SIR) at the input of the receiver 24. As has been mentioned before, this allows the BS 14 to reduce its transmit power as regards individual communications links to the UEs 12. Since in the WCDMA standard the total transmit power of the BS 14 is limited, transmit power reduction on individual communications links corresponds to an increased network capacity.

Figure 4:
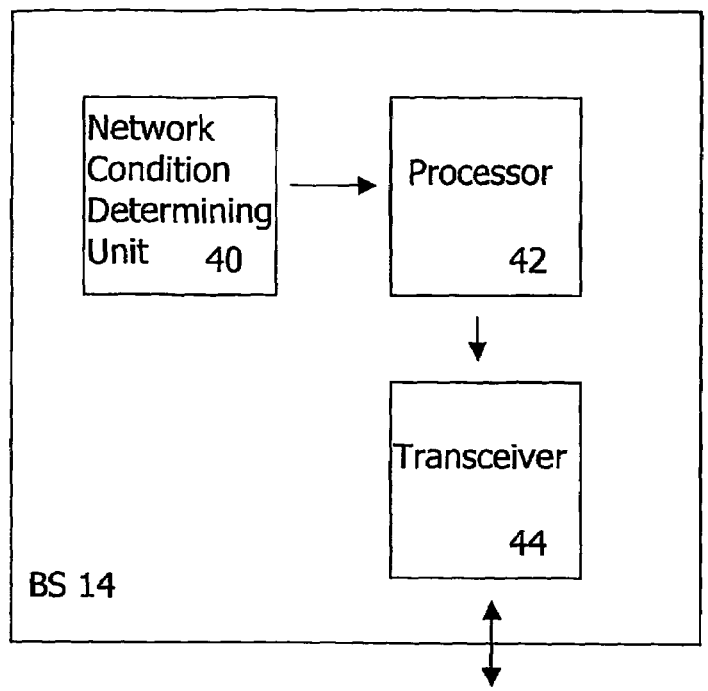
FIG. 4 is a schematic block diagram of a base station BS of the communications system of FIG. 1.

Now the individual elements of the BS 14 depicted in FIG. 1 will be explained with reference to FIG. 4. As becomes apparent from FIG. 4, the BS 14 includes a unit 40 for determining a network condition, a processor 42 for generating performance control information, and a transceiver 44 with a transmitter component for transmitting a signal including the control information (performance control signal). The performance control information may be included in a signal that contains no additional information. Alternatively, the control information may be appended to a signal that contains data or additional control information.

Now the function of the individual elements of the WCDMA communications network 10 depicted in FIG. 1 in context with receiver performance control will be explained with reference to FIGS. 2 to 5.

In the following it will be assumed that the receiver structures of the UE receiver 24 guarantee a receiver performance that is higher than the minimum performance specified by a particular standardization body. It is clear that the higher receiver performance is accompanied by a higher power consumption. Since the UE 12 is battery-operated, the higher receiver performance, although being beneficial for the network as a whole in terms of reduced interference and higher network capacity, has to be paid with shorter stand-by periods and speaking times of the UE 12. Since in the exemplary WCDMA scenario with sophisticated power control mechanisms and guaranteed QoS the enhanced receiver performance has no clear benefit for the UE 12, the shorter stand-by periods and speaking times of the UE 12 might potentially prevent a widespread incorporation of advanced receiver structures in UEs.

In order to reduce the negative effect of increased power consumption often associated with advanced receiver structures, several of the receiver structures of the UE receiver 24 can be switched between a first state corresponding to an enhanced receiver performance and one or more further states corresponding to a somewhat reduced receiver performance but also to a reduced power consumption of the UE 12.

It is thus possible to exploit the capabilities of advanced receiver structures e.g. to increase the network capacity and/or the end-to-end performance experienced by the UE 12. If, however, the network or the UE 12 cannot benefit from the advanced receiver structures the advanced receiver structures may be disabled or at least their effects (and thus their power consumption) may be reduced to increase the periods after which the battery 22 of the UE 12 has to be recharged.

According to a first embodiment of the invention the UE's 12 advanced receiver structures are controlled by the BS 14. According to a second embodiment of the invention that is not depicted in the Figures, the UE has an internal control mechanism.

According to the first embodiment, the BS 14 determines in a first step a particular network condition that can be influenced by means of a control of the advanced receiver structures 26, 28, 30, 32 of the UE 12. The network condition may be load of an individual cell serviced by the BS 14, in particular when there is a capacity problem in the cell.

The BS 14 has several possibilities to determine the load of a particular cell. In general, the cell load can easily be determined based on information that is anyway available at the BS 14.

One way to determine the cell load is admission control. Information obtained during admission control includes the total number of UEs serviced by the BS 14. A large number of UEs indicates that there might be a capacity problem.

A further parameter indicative of the cell load is the current transmit power of the BS 14. An indication of the cell load can for example be obtained by comparing the current transmit power with the maximum transmit power of the BS 14.

Once the cell load has been determined, the BS 14 has to decide whether or not receiver performance control is required. In other words, if the current cell load indicates capacity problems, the BS 14 will initiate a receiver performance control process with respect to one or more UEs 12 that are attached to the BS 14.

To that end the BS 14 first has to estimate the capacity gains that can be effected by means of receiver performance control. The BS 14 thus determines, e.g. during admission control, the number of UEs with advanced receiver structures serviced by the BS 14 and the particular types of advanced receiver structures available. From this number the BS 14 can estimate the capacity gain that can be achieved if the advanced receiver techniques of one or more UEs are activated. On the other hand the BS 14 can determine the capacity loss associated with deactivating or reducing already activated advanced receiver techniques.

Then the BS 14 generates a performance control signal that is transmitted to one or more UEs 12. According to a first variant the performance control signal already specifies particular types and states of receiver structures. According to a second variant the performance control signal only specifies a particular receiver performance class and a receiving UE may decide the types and states of receiver structures that are to be controlled to satisfy the requirements of the receiver performance class indicated in the control signal.

Now the first variant will be described in connection with a staged performance control cycle. According to the staged approach the BS 14 will not simultaneously command all UEs to fully activate their advanced receiver structures. Instead, the BS 14 in a first step only addresses one or more individual classes of UEs 12 and/or one or more particular advanced receiver structures. In a second step the BS 14 determines the cell load anew after it has waited a reasonable period of time to enable the addressed UEs 12 to activate the respective receiver structures. In the case that the BS 14 still determines capacity problems, the BS 14 will in a third step command e.g. one or more additional classes of UEs 12 to activate their respective receiver structures. After a while the BS 14 will then determine the cell load once more and so on.

For example the BS 14 may in a first step request activation of the interference cancellation algorithm (reference numeral 30 in FIG. 3) from all UEs that have this advanced receiver structure. Should the capacity gain thus obtained be not sufficient, the BS 14 requests in a further step the activation of additional RAKE fingers (reference numeral 28 in FIG. 3). If the additional capacity gain is still not enough, a change of a deinterleaving/decoding scheme (reference numeral 32 in FIG. 3) may be requested by the BS 14 from the UE 12. If necessary, the BS 14 may proceed with additionally requesting a change of the demodulation scheme (e.g. from 16 QAM to QPSK; reference numeral 26 in FIG. 3) and change it own modulation scheme accordingly.

Figure 5:
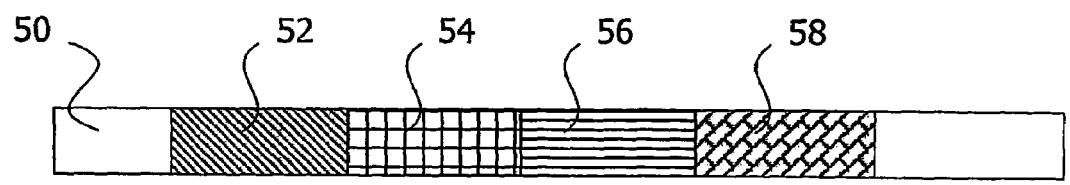
FIG. 5 is a schematic diagram of a performance control signal that is transmitted from the BS of FIG. 4 to the UE of FIG. 2.

To implement the staged performance control cycle discussed above, the BS 14 generates a succession of dedicated performance control signals 50 as depicted in FIG. 5.

From FIG. 5 it becomes apparent that the performance control signal 50 has a plurality of signal portions 52 to 58. A first signal portion 52 indicates the purpose of the control signal 50, i.e. that receiver performance control is required. Especially in the most simple embodiment of only one receiver structure type with only two states no additional information is required because a UE may in response to receipt of the control signal 50 simply switch the state of the receiver structure.

Usually, and in particular in a staged performance control scenario, the control signal 50 will contain additional information like a signal portion 54 indicating the particular type of receiver structure that is to change its state, a signal portion 56 indicating the state the receiver structure indicated in signal portion 54 is supposed to assume, and a further signal portion 58 addressing one or more particular classes of UEs.

Once one or more types of advanced receiver structures have been activated or enhanced as has been explained above, the BS 14 continues to monitor the cell load. If it is determined after a while that capacity problems no longer exist, the BS 14 will request to deactivate (including lowering the capabilities of) the advanced receiver structures. Thus, the increased power consumption associated with the advanced receiver structures can be reduced to increase the stand-by periods and speaking times of UEs 12 with advanced receiver structures.

The deactivation process can be performed in a staged manner similar to the staged activation process that has been described above. Deactivation may be performed using the performance control signal depicted in FIG. 5.

According to the first variant of controlling receiver performance discussed above the performance control signal indicated specific types and states of receiver structures. According to the preferred second variant, the performance control signal only specifies one of a plurality of predefined performance classes. In such a case a control signal similar to the control signal 50 depicted in FIG. 5 need only comprise a signal portion that contains information indicative of a specific performance class. Each UE 12 may then decide itself the types of receiver structures that are to change their state in dependence of the performance class specified in the control signal. Again, a staged approach as mentioned above may be used as regards the performance classes specified in a succession of control classes.

Receiver performance control can be effected in a forced manner. This means that every UE will immediately act on a performance control signal without a further decision process, in particular if the control signal indicates that the receiver performance is to be increased. If, however, a reduced receiver performance is requested, an UE may decide itself whether or not it follows the request.

If power consumption of the UE is not a problem, e.g. because the UE is attached to a vehicle battery (car mounted UE), the UE may decide to keep receiver performance high and ignore a deactivating performance control signal from the BS 14. On the other hand if the UE determines that the capacity of its battery is very low, it may decide to refrain from activating or enhancing its one or more advanced receiver structures, thus ignoring an activating performance control signal from the BS 14.

According to the second embodiment of the invention, the UE 12 has an internal mechanism (not depicted in FIG. 2) for determining the cell load, the interference level or any other parameter indicative of a network condition. Like at the BS 14, such a parameter can be readily available so that in most cases no further hardware or software is needed for this purpose.

One possibility to determine the cell load within the UE 12 is to assess the reaction of the network to power control information that is sent uplink by the uplink signalling unit 34 depicted in FIG. 3. If for example the BS 14 does not increase its transmit power towards to UE 12 in response to one or more corresponding requests on uplink, the UE 12 can conclude that the cell load is high.

Once the cell load has been determined, the performance control unit 20 of the UE 12 decides whether or not one of the available advanced receiver structures 26, 28, 30, 32 shown in FIG. 3 are to change their state. If required, the performance control unit 20 generates appropriate performance control signals that are sent to the individual advanced receiver structures 26, 28, 30, 32 for receiver performance control.

According to one aspect, the invention allows an optimization of the trade-off between UE power consumption on the one hand and UE performance or network capacity on the other hand. However, while the present invention has been described with respect to particular embodiments, those skilled in the art will recognize that the present invention is not limited to those specific embodiments described and illustrated herein. Therefore, while the present invention has been described in relation to its preferred embodiments, it is to be understood that this disclosure is only illustrative. Accordingly, it is intended that the invention will be limited only by the scope of the claims appended hereto.

The invention claimed is:

1. A method of operating a network component of a wireless communications network, the network component having a receiver with a receiver performance that is adjustable by means of at least one receiver structure that can assume two or more states including a first state corresponding to an enhanced receiver performance and a second state corresponding to a reduced receiver performance and a reduced power consumption, comprising:
    the network component determining a cell load by assessing a reaction of the network to one or more uplink power control commands transmitted from the network component to a further network component, wherein the reaction of the network is whether the network has increased its transmit power towards the network component in response to the one or more uplink power control commands;
    the network component generating, in dependence of the network condition, a performance control signal that aims at controlling receiver performance;
    the network component controlling the state of at least one of the receiver structures in dependence of the performance control signal.

2. The method of claim 1, wherein the first state is a first activated state and the second state is a second activated state or a deactivated state.

3. The method of claim 1, wherein the network component decides how the state of the at least one of the receiver structures will be controlled in dependence of the performance control signal.

4. A component of a wireless communications network, comprising:
    a receiver with a receiver performance that is adjustable by means of at least one receiver structure that can assume two or more states including a first state corresponding to an enhanced receiver performance and a second state corresponding to a reduced receiver performance and a reduced power consumption;
    an uplink signaling unit for sending power control information uplink to a further network component;
    a unit for assessing a reaction of the network to the power control information and for determining a cell load based on the reaction of the network and for providing a performance control signal that aims at controlling the receiver performance in dependence of the cell load, wherein the reaction of the network is whether the network has increased its transmit power towards the component of the wireless communications network in response to the power control information; and
    a performance control unit for controlling the states of the receiver structures in dependence of the performance control signal.

5. The component of claim 4, wherein the receiver structure is constituted by at least one of a piece of software and a piece of hardware.

6. The component of claim 4, wherein the receiver structure includes at least one of an interference cancellation algorithm, a variable deinterleaving scheme, variable decoding scheme, a variable demodulation mechanism, an antenna switch or combiner and one or more RAKE fingers.

7. The component of claim 4, wherein the unit for providing the performance control signal is configured as an interface for wireless communications.

8. The component of claim 4, wherein the network component is battery-operated.

* * * * *